United States Patent
Thompson et al.

(10) Patent No.: US 11,843,313 B2
(45) Date of Patent: Dec. 12, 2023

(54) METHOD AND APPARATUS FOR CONTROLLING ELECTRIC MOTORS

(71) Applicant: BorgWarner Gateshead Limited, London (GB)

(72) Inventors: Ken Thompson, Northumberland (GB); Jolene Zhou, Gateshead (GB); Jack Dunn, Auckland (GB)

(73) Assignee: BorgWarner Gateshead Limited, London (GB)

( * ) Notice: Subject to any disclaimer, the term of this patent is extended or adjusted under 35 U.S.C. 154(b) by 0 days.

(21) Appl. No.: 17/658,100

(22) PCT Filed: Oct. 8, 2020

(86) PCT No.: PCT/GB2020/052489
§ 371 (c)(1),
(2) Date: Apr. 6, 2022

(87) PCT Pub. No.: WO2021/069895
PCT Pub. Date: Apr. 15, 2021

(65) Prior Publication Data
US 2023/0031142 A1    Feb. 2, 2023

(30) Foreign Application Priority Data
Oct. 8, 2020 (GB) ...................................... 1914528

(51) Int. Cl.
*H02M 1/32* (2007.01)
*H02P 3/22* (2006.01)
(Continued)

(52) U.S. Cl.
CPC .............. *H02M 1/322* (2021.05); *H02P 3/22* (2013.01); *H02P 27/06* (2013.01)

(58) Field of Classification Search
CPC ............ H02M 1/322; H02P 3/22; H02P 27/06
(Continued)

(56) References Cited

U.S. PATENT DOCUMENTS 5,510,689 A * 4/1996 Lipo ....................... H02P 21/18
318/807
2016/0303978 A1  10/2016 Merkel
(Continued)

FOREIGN PATENT DOCUMENTS

GB    2552663    2/2018

OTHER PUBLICATIONS

JP 2001224194 A "Rotation Control Method of Permanent Magnet Synchronous Motor" Inv: Takemasa Akira et al. (Year: 2001).*
(Continued)

Primary Examiner — Jorge L Carrasquillo
(74) Attorney, Agent, or Firm — Woodard, Emhardt, Henry, Reeves & Wagner, LLP

(57) ABSTRACT

There is described a method of controlling an inverter supplying power to a permanent magnet AC, PMAC, motor having a plurality of phase windings, The method comprises: selecting a first phase winding of the PMAC motor; electrically connecting the first phase winding to a first DC terminal of a DC link circuit at a first time, and maintaining the connection between the first phase winding and the first DC terminal: determining a flux difference between the first phase winding and a second phase winding of the PMAC motor; selecting a second time to electrically connect the second phase winding to the first DC terminal; electrically connecting the second phase winding to the first DC terminal at the second time; and maintaining the connection between the second phase winding and the first DC terminal. The second time is selected based on the determined flux difference.

20 Claims, 4 Drawing Sheets

(51) Int. Cl.
*H02P 7/06* (2006.01)
*H02P 27/06* (2006.01)

(58) Field of Classification Search
USPC .......................................................... 318/801
See application file for complete search history.

(56) References Cited

U.S. PATENT DOCUMENTS

| 2016/0322927 | A1 | 11/2016 | Merkel | |
|---|---|---|---|---|
| 2019/0165704 | A1 | 5/2019 | Martin | |
| 2019/0229664 | A1* | 7/2019 | Kobayashi | H02P 21/141 |

OTHER PUBLICATIONS

Combined Search and Examination Report in GB1914528.3 dated Nov. 27, 2019.
PCT Search Report and Written Opinion in PCT/GB2020/052489.

* cited by examiner

METHOD AND APPARATUS FOR CONTROLLING ELECTRIC MOTORS

The present invention relates to controlling power supply in electric motors, specifically multi-phase electric motors. More particularly, the invention provides improved means for initiating an active short circuit mode in multi-phase electric motors, which may mitigate problems with prior art systems.

Electric motors are used in various machines, most notably in vehicles such as cars, but also in other industrial and commercial equipment, such as fans, pumps, elevators and refrigerators. Such electric motors generally have controllers arranged to control the operation of the motor. Many of these electric motors are multi-phase, for example three-phase. Many of these electric motors are powered by a DC-voltage supply, e.g. by battery power. An inverter may be provided to convert the DC-voltage into AC-voltage to drive each of the phases.

The invention is set out in the independent claims. Preferable features are set out in the dependent claims.

There is described herein: a method of controlling an inverter supplying power to a permanent magnet AC, PMAC, motor having a plurality of phase windings, the method comprising: selecting a first phase winding of the PMAC motor; electrically connecting the first phase winding to a first DC terminal of a DC link circuit at a first time, and maintaining the connection between the first phase winding and the first DC terminal; determining a flux difference between the first phase winding and a second phase winding of the PMAC motor; selecting a second time, different to the first time, to electrically connect the second phase winding to the first DC terminal, wherein the second time is selected based on the determined flux difference between the first phase winding and the second phase winding; electrically connecting the second phase winding to the first DC terminal at the second time, and maintaining the connection between the second phase winding and the first DC terminal.

In some cases, motors must be reduced to a zero torque condition (or safe state), or their power reduced, fairly speedily, for example in the case of a fault with the electric motor or power source or an accident, e.g. a vehicle may crash. For safety reasons and to prevent (further) damage to equipment it is often important that motors are stopped relatively quickly. For example, in an accident it is desirable to stop the wheels of a vehicle turning as quickly as possible. A trip in the motor can result in an undemanded braking torque, whilst a trip and battery fault can cause the inverter to be damaged from high voltages. Particularly with permanent magnet motors, if the back EMF is high, stopping the motor by disconnecting the battery could cause the DC link current to go high enough to damage the inverter. Another method for rapidly stopping the motor is to turn off the motor switches, e.g. IGBT (or MOSFETs), however this can cause natural rectification back to the DC link power supply and significant motor braking. If the vehicle is cornering at high speed, the high braking torque may lead to vehicle wheel loss of traction and the car could, for example, spin off the road.

Therefore an Active Short Circuit (ASC) mode can be applied to stop the motor whilst providing no natural rectification and keeping the braking torque low. The DC link voltage will drop in a safe manner. Active short circuit is a fairly simple way to reduce these problems (as no active control is required) and energy is dissipated in the motor (so no battery is required). Using ASC mode prevents a large back EMF to prevent an undemanded braking torque and/or can protect the inverter and motor from damage. In a multi-phase motor, the ASC mode involves short-circuiting all of the phase windings in the motor, for example by connecting them to the positive or negative connection point of the DC link.

However rapidly entering ASC mode in the motor can cause significant transient currents which can also damage the inverter or motor. Application of ASC can also cause rotor magnets in the motor to be de-magnetized and/or damage other components, such as the switches (e.g. IGBTs/MOSFETs) or the capacitors. The methods and systems described herein seek to mitigate these issues, and in particular the transient currents.

By short circuiting the phase windings at different times, which are based on the magnetic flux in the phases, it is possible to provide an improved way of initiating an active short circuit (ASC) mode in a multi-phase PMAC motor. Advantageously, by staggering the application of ASC on each of the phases based on the flux difference between the phases it is possible to provide a reduction in the transient currents that occur in motors when ASC is applied.

The inverter may comprise a plurality of power output terminals, where each power output terminal is switchably connected to two DC terminals of a DC link circuit by switching elements for providing an AC power supply at the each power output terminal. The each power output terminal may be configured to provide said AC power supply to a corresponding one of a plurality of phase windings of the PMAC motor. In the active short circuit mode, selected ones of the switching elements can be maintained in a conducting state so that the plurality of power output terminals are electrically connected together.

Selecting a first phase winding of the PMAC motor may thus comprise selecting a first power output terminal of the plurality of power output terminals, wherein the first power output terminal corresponds to the first phase winding of the PMAC motor.

Electrically connecting the first phase winding to a first DC terminal of a DC link circuit can comprise switching a first switching element into the conducting state at a first time to electrically connect the first phase winding to the first DC terminal of the two DC terminals of the DC link circuit and maintaining the connection between the first phase winding and the first DC terminal can be done by maintaining the first switching element in the conducting state.

A second power output terminal of the plurality of power output terminals may correspond to the second phase winding of the PMAC motor. Electrically connecting the second phase winding to the first DC terminal can comprise switching a second switching element into the conducting state at the second time to electrically connect the second phase winding to the first DC terminal. Maintaining the connection between the second phase winding and the first DC terminal can comprise maintaining the second switching element in the conducting state.

The flux difference between the first phase winding and the second phase winding may mean the flux difference between the flux across a plurality of windings connected to the first phase and a plurality of windings connected to the second phase.

The method may further comprise: electrically connecting the second phase winding to a second terminal of the DC link circuit for a time interval between the first time and the second time. The second terminal is one of the two DC terminals of the DC link circuit. By connecting the second phase winding to the opposite DC terminal to the DC terminal the first phase winding is connected to, the current flow in the second phase winding will cause the flux in the second phase winding to approach the flux in the first phase winding. Thus the time interval between the first time and the second time can be selected based on the determined flux difference between the first phase winding and the second phase winding and a DC voltage of the second terminal of the DC link.

In some embodiments the second time and/or the time interval is selected based on the time required for the flux difference between the first phase winding and the second phase winding of the PMAC motor to reach zero.

Preferably, selecting the second time and/or the time interval comprises: collecting motor data at a plurality of sampling times, wherein there is a predetermined sampling time period between consecutive sampling times; calculating a corresponding plurality of time estimates; the time estimates each being an estimate of the time required for the flux difference between the first phase winding and the second phase winding of the PMAC motor to reach zero based on the collected motor data for the sampling time; comparing each of the plurality of time estimates to the predetermined sampling time period; and selecting a first time estimate that is shorter than or equal to the predetermined sampling time period; using the selected first time estimate to select the second time. The plurality of sampling times preferably follow the first time. The motor data may comprise or relate to the magnetic flux in the first and/or second phase windings, and/or may comprise or relate to the voltage of the DC link (from which the flux in the phase windings, difference in flux between the windings, can be found). Thus the magnetic flux difference between the second and first phase windings can be monitored after the first phase winding is short circuited (at the first time) and the selection of the second time can be adjusted to compensate for fluctuations in motor conditions that occur after the first time to improve the reduction of flux difference between the phases.

Preferably, the step of connecting the second phase winding to the first DC terminal at the second time comprises: applying a pulse of the length of the selected time estimate to electrically connect the second phase winding to the first DC terminal at the second time. The inverter (in normal operation) will generally control an AC wave in each of the phase windings by using pulse width modulation (PWM) to invert the DC voltage in the inverter in a sequence of pulses. Thus applying a pulse of the length of the time estimate means the second phase will be connected to the first DC terminal at exactly (or very close to) the second time, rather than having to wait until the next PWM time. The inverter can have a pulse width modulation timebase, which may be equal to the sampling time period.

The method may further comprise: determining a flux difference between the first phase winding and a third phase winding of the PMAC motor; selecting a third time, different to the first time and the second time, to electrically connect the third phase winding to the first DC terminal, wherein the third time is selected based on the determined flux difference between the first phase winding and the third phase winding of the PMAC motor; electrically connecting the third phase winding to the first DC terminal at the third time, and maintaining the connection between the third phase winding and the first DC terminal. A third power output terminal of the plurality of power output terminals may correspond to the third phase winding of the PMAC motor. At the third time the third power output terminal can be connected to the first DC terminal. Electrically connect the third phase winding to the first DC terminal can be done by switching a third switching element into the conducting state at the third time. Maintaining the connection between the third phase winding and the first DC terminal can be done by maintaining the third switching element in the conducting state.

In some embodiments, selecting a first phase winding, or selecting a first power output terminal of the plurality of power output terminals, of the PMAC motor comprises: determining the flux in each of the plurality of phase windings (or across the motor in each of one or more windings corresponding to each phase) of the PMAC motor; and selecting as the first phase winding, the phase winding having the highest flux value.

The method may further comprise, prior to the first time: switching a plurality of switching elements in the inverter to provide an AC power supply to each phase winding. This may be done by applying PWM.

In some embodiments, the method may further comprise monitoring the flux in each of the plurality of phase windings of the PMAC motor whilst switching the switching elements to provide the AC power supply to each phase winding.

In some embodiments, determining a flux difference between the first phase winding and a second phase winding and/or a third phase winding of the PMAC motor is based on the monitored flux in the first phase winding and second and/or third phase windings at the first time.

The second time, and optionally the third time, are generally later than (or after) the first time.

In some embodiments, determining the flux difference between the first phase winding and the second phase winding of the PMAC motor comprises: determining the voltage across the first phase winding as a function of time; determining the voltage across the second phase winding as a function of time; integrating the voltage across the first phase winding with respect to time; integrating the voltage across the second phase winding with respect to time; and determining the difference between the integral of the voltage across the first phase and the integral of the voltage across the second phase. Determining the voltage across the first phase winding may be done by determining the voltage at the first power output terminal and determining the voltage across the second phase winding may be done by determining the voltage at the second power output terminal.

In other embodiments, determining the magnetic flux difference between the first phase winding and the second phase winding of the PMAC motor comprises: determining the voltage across the first phase winding as a function of time; determining the voltage across the second phase winding as a function of time; determining the difference between the voltage across the first phase winding and the voltage across the second phase winding as a function of time; and integrating the difference between the voltage across the first phase winding and the voltage across the second phase winding with respect to time.

Preferably, determining the voltage across the first and second phase windings comprises determining one or both of: the voltage across the DC link circuit; and the pulse width modulation (PWM) output from the respective power output terminal.

In some embodiments, determining the magnetic flux difference between the first phase winding and the second phase winding of the PMAC motor comprises: determining the current in the first phase winding and in the second phase winding, such as by measuring using a Hall effect sensor, sense resistor or GMR (Giant Magnetoresistance) sensor.

In some embodiments determining the magnetic flux difference between the first phase winding and the second phase winding further comprises: determining the rotor angle of the motor. This may then be used to use a lookup table to identify the flux difference or the flux in the first phase winding and in the second phase winding based on the current and rotor angle. Determining the magnetic flux across the motor comprises using a model relating flux to current.

A method according to any preceding claim, further comprising: determining that a criterion for activating an active short circuit mode is satisfied prior to the first time, i.e. prior to initiating the ASC mode.

Preferably, the method further comprises: starting a timer when the criterion for activating the short circuit mode is satisfied; and electrically connecting the plurality of phase windings to the first DC link terminal after the timer reaches a predetermined time threshold so that the plurality of power output terminals are electrically connected together, regardless of whether the first time or the second time, or optionally the third time, has been reached.

The first time preferably immediately follows the determination that the criterion for activating the short circuit mode is satisfied.

There is also described herein: a method of controlling an inverter supplying power to a permanent magnet AC, PMAC, motor, the method comprising: initiating an active short circuit mode of the inverter, wherein the inverter comprises a plurality of power output terminals, and each power output terminal is switchably connected to two DC terminals of a DC link circuit by switching elements for providing an AC power supply at the each power output terminal, and wherein the each power output terminal is configured to provide said AC power supply to a corresponding one of a plurality of phase windings of the PMAC motor, and wherein in the active short circuit mode selected ones of the switching elements are maintained in a conducting state so that the plurality of power output terminals are electrically connected together; wherein initiating the active short circuit mode comprises: selecting a first power output terminal of the plurality of power output terminals, wherein the first power output terminal corresponds to a first phase winding of the PMAC motor; switching a first switching element into the conducting state at a first time to electrically connect the first phase winding to a first DC terminal of the two DC terminals, and maintaining the first switching element in the conducting state, and determining a flux difference between the first phase winding and a second phase winding of the PMAC motor, wherein a second power output terminal of the plurality of power output terminals corresponds to the second phase winding of the PMAC motor; selecting a second time, different to the first time, to electrically connect the second power output terminal to the first DC terminal, wherein the second time is selected based on the determined flux difference between the first phase winding and the second phase winding of the PMAC motor; switching a second switching element into the conducting state at the second time to electrically connect the second phase winding to the first DC terminal, and maintaining the second switching element in the conducting state.

There is also described herein a computer-readable medium comprising instructions which, when executed by a computer, cause the computer to carry out any of the methods described above.

There is also described herein a controller for controlling an inverter supplying power to a permanent magnet AC, PMAC, motor having a plurality of phase windings, the controller comprising a processor configured to: select a first phase winding of the PMAC motor; electrically connect the first phase winding to a first DC terminal of a DC link circuit, and maintain the connection between the first phase winding and the first DC terminal; determine a flux difference between the first phase winding and a second phase winding of the PMAC motor; select a second time, different to the first time, to electrically connect the second phase winding to the first DC terminal, wherein the second time is selected based on the determined flux difference between the first phase winding and the second phase winding; electrically connect the second phase winding to the first DC terminal at the second time, and maintain the connection between the second phase winding and the first DC terminal.

There is also described herein a controller for controlling an inverter supplying power to a permanent magnet AC, PMAC, motor, the controller comprising a processor configured to: initiate an active short circuit mode of the inverter, wherein the inverter comprises a plurality of power output terminals, and each power output terminal is switchably connected to two DC terminals of a DC link circuit by switching elements for providing an AC power supply at the each power output terminal, and wherein the each power output terminal is configured to provide said AC power supply to a corresponding one of a plurality of phase windings of the PMAC motor, and wherein in the active short circuit mode selected ones of the switching elements are maintained in a conducting state so that the plurality of power output terminals are electrically connected together; wherein initiating the active short circuit mode comprises the processor: selecting a first power output terminal of the plurality of power output terminals, wherein the first power output terminal corresponds to a first phase winding of the PMAC motor; controlling a first switching element to switch into the conducting state at a first time to electrically connect the first phase winding to a first DC terminal of the two DC terminals, and controlling the first switching element to remain in the conducting state, and determining a flux difference between the first phase winding and a second phase winding of the PMAC motor, wherein a second power output terminal of the plurality of power output terminals corresponds to the second phase winding of the PMAC motor; selecting a second time, different to the first time, to electrically connect the second power output terminal to the first DC terminal, wherein the second time is selected based on the determined flux difference between the first phase winding and the second phase winding of the PMAC motor; controlling a second switching element to switch into the conducting state at the second time to electrically connect the second phase winding to the first DC terminal, and controlling the second switching element to remain in the conducting state.

Each of the controllers may be further configured to perform any of the methods described above.

There is also described herein a system comprising: any of the controllers described above; and an inverter for a multi-phase permanent magnet motor having a first phase switching circuit and a second phase switching circuit.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE FIGURES

Methods and devices for controlling inverters for PMAC motors are described by way of example only, in relation to the Figures, wherein.

DETAILED DESCRIPTION

Figure 1:
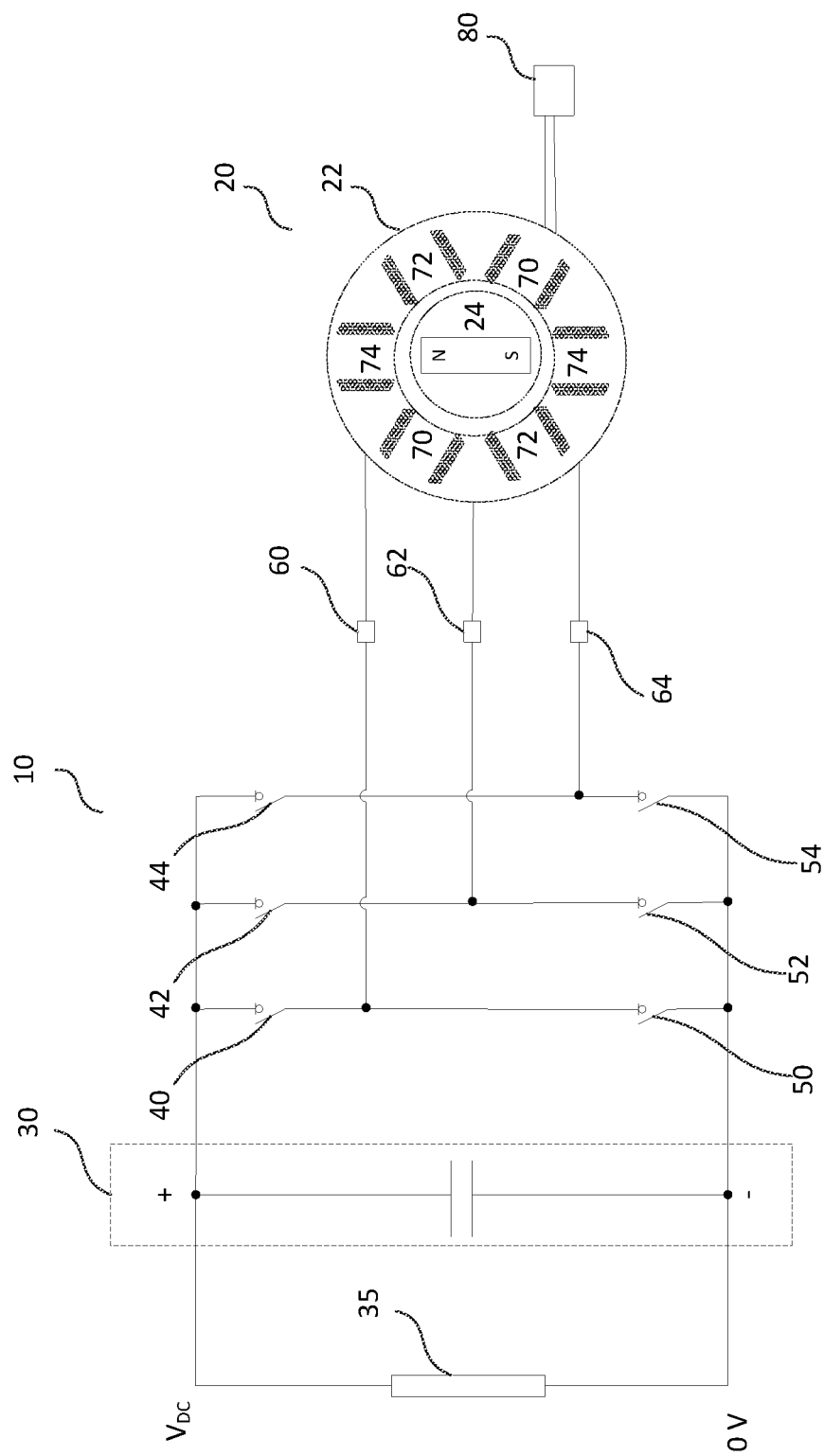
FIG. 1 shows an example of an inverter for a permanent magnet motor.

FIG. 1 shows an exemplary inverter 10 for a permanent magnet motor. In this case, the inverter 10 is arranged to drive the motor 20 of an electric vehicle. A DC link circuit 30 is connected across a power source 35. The voltage at the negative DC link terminal is 0 V and at the positive DC link terminal is $V_{DC}$. The value of $V_{DC}$ can vary over time. The inverter 10 comprises three phase switching circuits. A bridge circuit is provided, comprising a switching element 40, 42, 44 for each phase on an upper branch connected to the positive terminal of the DC link circuit 30, and a switching element 50, 52, 54 for each phase on a lower branch connected to the negative terminal of the DC link circuit 30. The switching elements 40, 42, 44, 50, 52, 54 can for example be IGBTs or MOSFETs. An output from each phase is connected to one of the three phase terminals 60, 62, 64 of the motor 20.

The motor 20 comprises a stator 22 and a rotor 24. The rotor 24 in FIG. 1 is shown with one permanent magnet, but in general rotors for such permanent magnet motors comprise a plurality of permanent magnets arranged to provide a permanent, alternating magnetic field around the circumference of the rotor 24. The stator 22 comprises a yoke which surrounds the rotor 24. The stator 22 has windings 70, 72, 74 arranged around the stator 22. In FIG. 1 two windings are shown connected to each phase (phase terminal 60 is connected to the windings 70, phase terminal 62 to windings 72 and phase terminal 64 to windings 74). In this example each winding is located opposite to another winding of the same phase. Thus the windings 70, 72, 74 can be driven by AC to produce a rotating magnetic field. In order to drive the motor 20 effectively, the timing of the excitation of each of the three phases is selected based upon the position of the rotor. The motor phases may be connected in a delta or wye arrangement.

In this embodiment there is also provided a current sensor 80, such as a Hall sensor for sensing current in each of the phases in the motor, e.g. the current through each of the windings, or in at least one winding in each phase.

The three phase terminals, or drives 60, 62, 64 are all coupled to receive energy from the power source 35. Each of the phase drives 60, 62, 64 is also coupled to a corresponding one of the three phase windings of the motor 20. Each phase terminals 60, 62, 64 is coupled to a different phase winding. The phase terminals 60, 62, 64 are each controllable by the switching elements 40, 42, 44, 50, 52, 54 to modulate the delivery of electrical energy from the power source 35 to the corresponding phase winding.

In normal operation switching elements 40, 42, 44, 50, 52, 54 are operated at different times to provide the alternating three phases to drive the motor 20. There are three legs connected in parallel with the power source 35 and DC link circuit 30. Each leg has two switching elements; one on an upper branch and the other on a lower branch. The first leg has a first switching element 40 on the upper branch and a second switching element 50 on the lower branch. The two switching elements 40, 50 are operated alternately to provide alternating current to the first phase terminal 60. Thus when the first switching element 40 is on/closed, the second switching element 50 will be off/open, and vice versa. The second leg has a first switching element 42 on the upper branch and a second switching element 52 on the lower branch. The two switching elements 42, 52 are operated alternately to provide alternating current to the second phase terminal 62 (i.e. when the first switching element 42 is on/closed, the second switching element 52 will be off/open, and vice versa). The switching elements 42, 52 on the second leg are switched 120 degrees out of phase with the switching elements 40, 50 on the first leg. Equally, the third leg has a first switching element 44 on the upper branch and a second switching element 54 on the lower branch. The two switching elements 44, 54 are operated alternately to provide alternating current to the third phase terminal 64 (i.e. when the first switching element 44 is on/closed, the second switching element 54 will be off/open, and vice versa). The switching elements 44, 54 on the third leg are switched 120 degrees out of phase with those on the first leg and on the second leg, to provide three phase alternating current to the motor 20.

The switching elements may be switched at a constant, or variable frequency to produce a sine wave alternating current AC in the motor winding. The frequency of the sine wave AC may be around 50 Hz, for example between 20 Hz and 100 Hz, or between around 30 Hz and 70 Hz. In other embodiments the frequency can be up to around 1 kHz, for example the frequency may be up to between 500 Hz and 2000 Hz.

If the motor 20 has to be stopped or disabled quickly, e.g. if a fault occurs in the motor system, a high back EMF (electromotive force) may occur, which can cause rectification back to the DC link circuit 30 or DC power supply 35 of the inverter. This may result in an undemanded braking torque. In worse conditions, the DC link voltage can exceed the operating level of the capacitors and/or switches, causing damage to the motor or inverter components.

Therefore an Active Short Circuit (ASC) mode can be applied. This prevents a large back EMF on the DC link circuit 35 to keep its level below the trip level, protecting the inverter 10 and motor 20. In the active short circuit mode all of the output terminals 60, 62, 64 are connected to the same DC link terminal, either all to the positive or all to the negative terminal of the DC link circuit 30, for example either by maintaining all of the switches 40, 42, 44 on the upper branches in a closed position (or conducting state) or by maintaining all of the switches 50, 52, 54 on the lower branches in a closed position (or conducting state). Unfortunately due to inductance, e.g. in the motor windings, initial application of the ASC mode from normal mode operation can cause a significant transient current, e.g. high current spikes, in the motor windings, which may be transferred to the inverter 10. This can be sufficient to damage the motor 20 and/or inverter 10.

Therefore the present invention provides a means to prevent or reduce this transient current on application of ASC mode, as will be described further in relation to FIG. 2.

Figure 2:
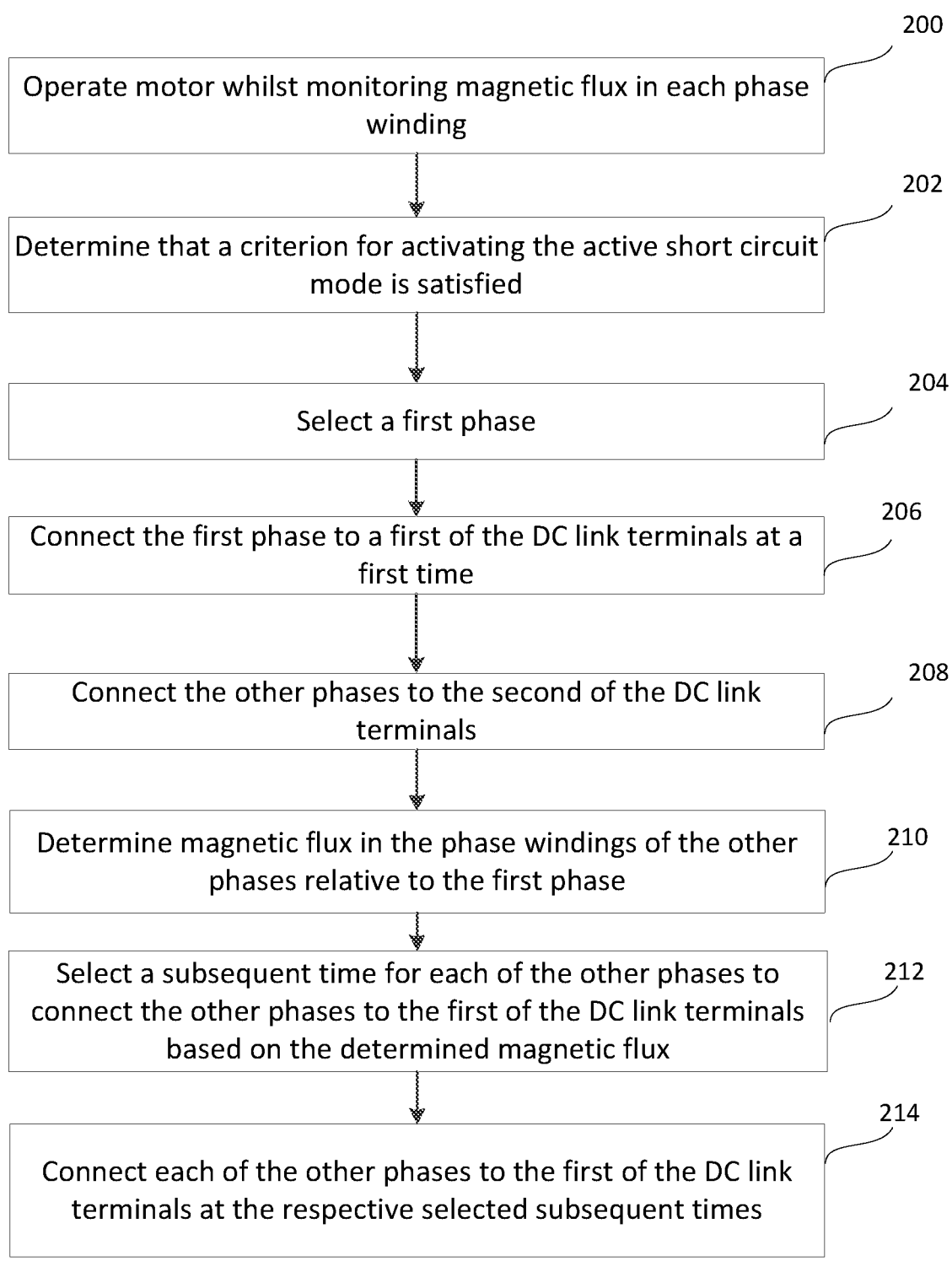
FIG. 2 shows an example method of activating active short circuit mode in a permanent magnet motor.

FIG. 2 shows an exemplary method 2 of activating an active short circuit mode in a multi-phase permanent magnet motor, which can reduce the transient current.

There may be provided an inverter controller to control the inverter 10, which comprises logic to effect the method 2. Preferably the same controller which controls the switching of the inverter switches 40, 42, 44, 50, 52, 54 in the normal operating mode can be used to manage the transfer to the ASC mode. However in some embodiments a parallel set of hardware comprising an additional controller can be provided that is capable of controlling the transfer to the ASC mode. This has the advantage that if the primary hardware fails there is a redundant route to apply ASC, although the main controller (used to control the inverter in normal operating mode) would normally (though not always) be provided with that capability as well.

Initially, at step 200, the motor 20 is operating in a normal mode, being driven using the three-phase AC supply from the inverter 10. Whilst the motor 20 is operating in the normal mode, the magnetic flux in each of the phase windings is monitored. The magnetic flux in the windings relating to each phase may be determined periodically, for example at sampling time intervals. The sampling time intervals may be for example around 30 µs to 500 µs, or around 100 µs to 300 µs.

The magnetic flux can be determined in a number of ways. In this example the flux is calculated as the integral of the phase voltage, i.e. the voltage at the phase output terminal, e.g.

$$Flux_x(t) = \int V_x dt$$

where $Flux_x(t)$ is the magnetic flux across the $x^{th}$ phase windings in the motor at time t;

$V_x$ is the voltage at the $x^{th}$ phase output terminal over time, e.g. the voltage at the corresponding output terminal 60, 62, 64 to the motor 20. The voltage may be measured with respect to the negative DC link terminal.

By determining the output phase voltages on the inverter 10 (i.e. voltage at the output terminals 60, 62 and 64) over time, the flux for each motor phase can be calculated. Thus at step 200 during normal operation the voltage at the output terminals may be measured or otherwise determined.

Preferably determining the output phase voltages on each output terminal 60, 62, 64 of the inverter 10 can be done by measuring the DC link voltage, $V_{DC}$, between the DC link positive and negative terminal and then assigning the voltage reading for that sample time according to the pulse width modulation (PWM) output from the power output terminal, e.g. a determination of whether the output terminal is electrically connected to the positive or negative terminal of the DC link, e.g. based on which switch is closed on the branch of the inverter feeding the output terminal. Other, second order factors, such as dead time, may also be used for determining the output phase voltage; second order factors become more relevant at low speeds, e.g. vehicle speeds below around 10 km/h.

Since the voltage across the DC bus/link $V_{DC}$ may vary as a function of time, the magnetic flux in each motor phase can sometimes be determined more accurately by taking voltage measurements and calculating flux continuously over time, rather than by predicting from initial measurements and models.

It has been found helpful to include an additional damping factor, D, which may be used to suppress voltage offset errors or initial offsets. The damping factor, D, generally has a value between 0 and 1, preferably between around 0.9 and 0.99. In such a case the magnetic flux in the $x^{th}$ phase windings can be calculated as:

$$Flux_x(t) = \int \left( V_x(t) - Flux_x(t) \cdot \frac{(1-D)}{\tau} \right) dt$$

The term in the integral which is associated with the damping factor may be considered a high pass filter having a time constant, τ, which may be around 100 ms.

Thus at each point in time the magnetic flux in the windings connected to each phase can be known. In some embodiments, it is the relative magnetic flux in the phase windings that is determined rather than an absolute value.

The change in flux at adjacent sample times, e.g. between time $t=t_A$ and time $t=t_A+\Delta t$, where $\Delta t$ is the sample time, can be given by:

$$Flux_x(t_A+\Delta t)=DFlux_x(t_A)+V_x(t_A)\Delta t$$

$\Delta t$ is the sample time, i.e. the time intervals between subsequent voltage measurements (measured in seconds); $\Delta t$ will generally be between around 30 µs to 500 µs.

$V_x$ is the average voltage at the $x^{th}$ phase output terminal between time t and time $\Delta t$.

The integration can be done using analogue electronics or digitally.

The flux values may be recorded in memory as they are calculated, for example in a memory of the controller that controls the inverter during normal operation, or in the controller that controls the inverter during a transition to ASC mode (which in some embodiments are the same controller). The flux values may be recorded in random access memory; later values of flux may be written over earlier flux values.

At step 202, it is determined that a criterion for activating an ASC mode in the motor 20 is satisfied. Generally ASC mode will need to be activated in the case of safety concerns, e.g. if a fault is detected in the motor, inverter, power source/battery, or in another part of the system (e.g. in a vehicle or machine that the motor is driving). In one example, determining a criterion for activating an ASC mode comprises detecting a vehicle has crashed. In another example, determining a criterion for activating an ASC mode comprises determining that the power source/battery is overheating. In another example, a criterion for activating an ASC mode comprises receiving an indication the vehicle is being towed, as ASC can prevent a back EMF in a towed vehicle, which may damage the inverter, caused by the motor movement.

In some embodiments, at step 202 the inverter controller determines that a criterion for activating an ASC mode in the motor 20 is satisfied by receiving a signal, such as a control signal or message, instructing the inverter to transition the motor into ASC mode. For example, where the motor is for an electric vehicle, this signal may be received from a vehicle control unit (VCU).

At step 204 a first phase is selected to short circuit first. Selecting the first phase to short circuit is based on the magnetic flux in each of the motor phase windings, e.g. the flux in each of the first, second and third phase windings. The flux in each set of phase windings is known from monitoring of the flux in each set of phase windings in step 200 (described above).

In this embodiment, short circuiting is performed by connecting the phase winding to the negative terminal of the DC link. The first phase selected is the phase with the highest magnetic flux through its motor windings. In this example, the phase with the highest magnetic flux is that at the first output terminal 60, driven by the switches 40, 50 on the first leg of the inverter circuit.

At step 206 the selected first phase is short circuited to the negative DC link terminal. The time at which the first phase is short circuited is referred to as a first time, $T_1$. When the first phase is short circuited, the first time $T_1$, is measured and recorded in memory (e.g. in the memory of the controller managing the transition to the ASC mode).

Short circuiting the phase is done by switching into a conducting state the second switching element 50 on the lower branch of the first leg, thus electrically connecting the output terminal 60 to the negative DC link terminal. At the same time, the first switching element 40 on the upper branch of the first leg is open. The second switching element 50 is maintained in the conducting state, so the voltage at the output terminal 60 decreases to and is maintained at the voltage of the negative DC link terminal, 0V.

In the following steps the objective is to balance the flux in the remaining phases, in this case by getting the flux in all the phases as close as possible to the flux in the first phase.

At step 208 the other two phases (in this example, the second and third phases) are connected to the positive terminal of the DC link. This is done by switching into a conducting state the first switching elements 42, 44 on the upper branches of the second and third legs of the inverter. At the same time the second switches 52, 54 on the lower branches of the second and third legs of the inverter are opened. Thus the output terminals 62, 64 are electrically connected to the positive DC link terminal, having a voltage of $V_{DC}$.

Preferably the remaining two phases are connected to the positive terminal of the DC link at the same time the first phase is connected to the negative DC link terminal (i.e. at the first time, $T_1$).

In some embodiments, at least one of the first switching elements 42, 44 on the second and third branches is already in a conducting state at the first time, in which case it is simply maintained in the conducting state.

At step 210 the flux in each of the second and third phase windings of the motor 20 at the first time (e.g. the magnetic flux at the first time, $T_1$, over all the motor windings connected to the second phase and third phase) is determined. The magnetic flux in the phase windings is known because it was being monitored in step 200. Thus determining the flux in the second and third phase windings can comprise recording the flux in the second and third phase windings at the first time.

The magnetic flux in each of the second and third phases can be determined relative to the flux in the phase with the highest flux, here the first phase.

In this example the flux in each of the phases is calculated during monitoring step 200, as the integral of the phase voltage, i.e. the voltage at the phase output terminal.

The flux in the second phase relative to the flux in the first phase can be calculated as follows:

$\text{Flux}_{2wrt1}(t) = \text{Flux}_2 - \text{Max}(\text{Flux}_1, \text{Flux}_2, \text{Flux}_3) = \text{Flux}_2(t) - \text{Flux}_1(t)$ $\text{Flux}_{2wrt1}(T_1) = \text{Flux}_2(T_1) - \text{Flux}_1(T_1)$ Equally, the flux in the third phase relative to the flux in the first phase is:

$\text{Flux}_{3wrt1}(T_1) = \text{Flux}_3(T_1) - \text{Flux}_1(T_1)$

Since in this example the flux in the first phase was the highest at the first time, the relative flux at the first time of the other two phases will be negative (with the flux of the first phase being zero).

In step 212 subsequent times (i.e. times after the first time) at which to connect each of the other phases to the negative terminal of the DC link are selected based on the magnetic flux at the first time for each phase across the motor (i.e. the flux in the motor windings of that phase) that was found in step 210. A second time is calculated for connecting the second phase output terminal 62 to the negative DC link terminal and a third time is calculated for connecting the third phase output terminal 64 to the negative DC link terminal.

The subsequent times are selected to allow the flux in each of the second and third phase windings to match the flux in the first phase winding before connecting the respective phase winding to the negative DC link terminal. Thus it is possible to balance flux in the motor and prevent excessive transient currents occurring. Therefore the subsequent time at which to connect each of the second and third phases to the negative terminal of the DC link is selected based on the magnetic flux for that phase relative to the magnetic flux of the first phase.

When the first switching elements 42, 44 on the upper branches of the second and third legs of the inverter are closed in step 208, the voltage at the second and third phase output terminal 62, 64 goes to $V_{DC}$ over time. Therefore the second time, $T_2$, at which to connect the second phase to the negative DC link can be calculated as follows:

$$T_2 = T_1 + \frac{Max(Flux_1, Flux_2, Flux_3) - Flux_2}{V_{DC}} = T_1 + \frac{-Flux_{2wrt1}(T_1)}{V_{DC}}$$

Where the fluxes are calculated with respect to the flux in the first phase, the first phase flux, $\text{Flux}_1$, is zero. The first phase selected was that with the highest magnetic flux, and is therefore the highest flux. Therefore the flux of the second and third phases relative to the first is negative, giving a positive time for the second and third phases to be connected to the negative DC link.

A third time, $T_3$, at which to connect the third phase to the negative DC link may be calculated as:

$$T_3 = T_1 + \frac{Max(Flux_1, Flux_2, Flux_3) - Flux_3}{V_{DC}} = T_1 + \frac{Flux_{3wrt1}(T_1)}{V_{DC}}$$

To simplify calculations, $T_1$ may be set to zero.

The first switch 42 on the upper branch of the second leg of the inverter circuit is maintained in a conducting state until the calculated second time. In step 214, at the second time, the second phase output terminal 62 is connected to the negative terminal of the DC link by closing the second switch 52 on the lower branch of the second leg of the inverter and maintaining it in the conducting state and simultaneously opening the first switch 42 on the upper branch of the second leg of the inverter circuit.

The first switch 52 on the upper branch of the third leg of the inverter circuit is maintained in a conducting state until the calculated third time. In step 214, at the third time, the third phase output terminal 64 is connected to the negative terminal of the DC link by closing the second switch 54 on the lower branch of the third leg of the inverter and maintaining it in the conducting state and simultaneously opening the first switch 44 on the upper branch of the third leg of the inverter circuit.

When all phases have been short circuited by connecting to the first terminal of the DC link, e.g. in this example to the negative terminal, the inverter 10 is operating in ASC mode.

As a numerical example, the fluxes in the first, second and third phases at the time ASC should be implemented may be as follows:

$$\text{Flux}_1 = 5 \text{ Volt-seconds (Vs)}, \text{Flux}_2 = 3 \text{ Vs}, \text{Flux}_3 = 1 \text{ Vs}$$

The relative fluxes of each of the second and third phases are thus:

$$\text{Flux}_{2(wrt1)} = -2 \text{ Vs}, \text{Flux}_{3(wrt1)} = -4 \text{ Vs}$$

If the DC voltage, $V_{DC}$240V, then the delay time after the first time at which to short circuit the second and third phases to the negative DC link are as follows:

$$T_2 - T_1 = \frac{0 - (-2)}{240} = 0.0083 \text{ seconds};$$

$$T_3 - T_1 = \frac{0 - (-4)}{240} = 0.0166 \text{ seconds}$$

Figure 3:
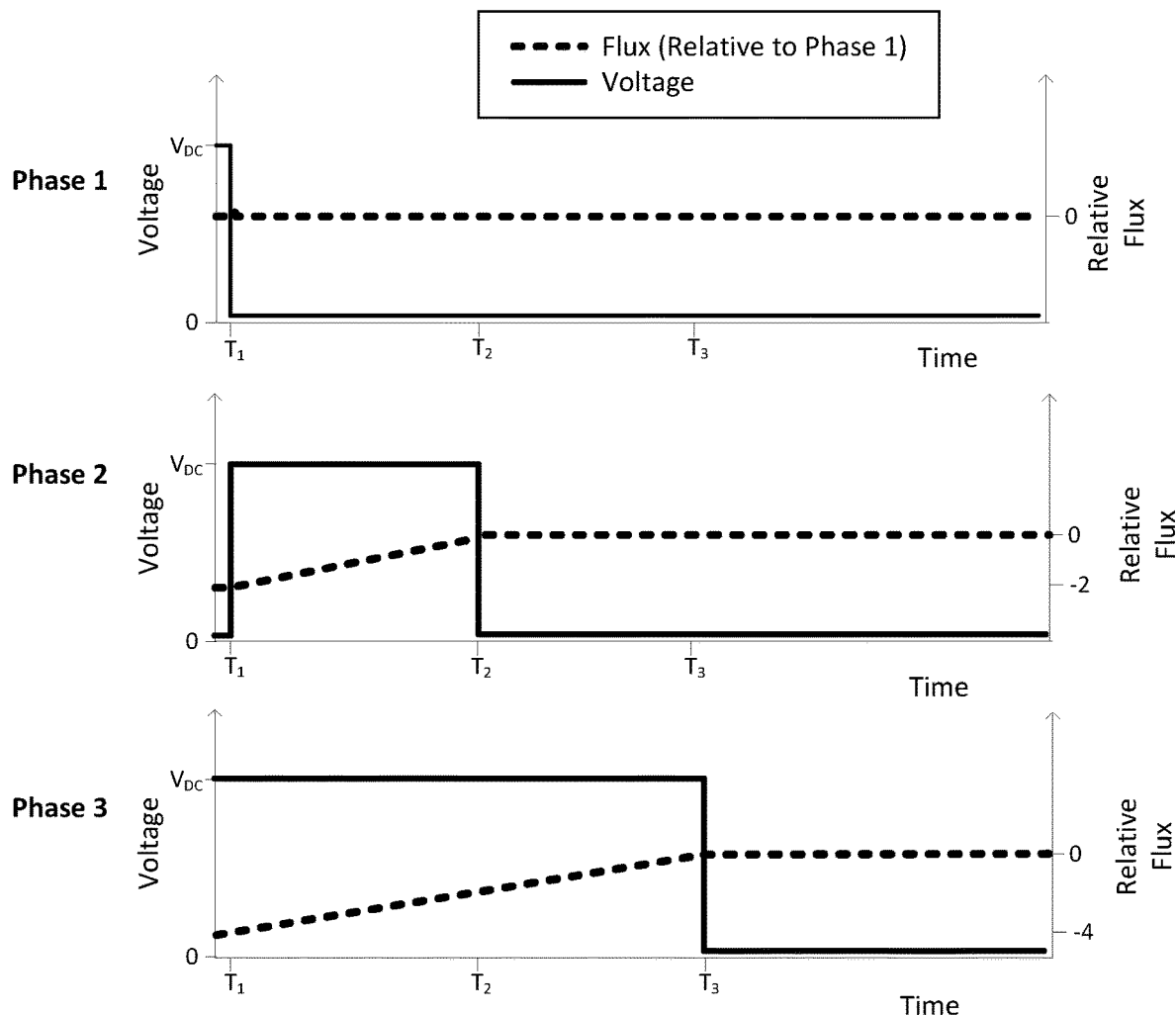
FIG. 3 shows graphs of the voltage and magnetic flux across motor phase windings.

FIG. 3 shows graphs of the voltage and magnetic flux across each of the phase windings in this example. Voltage is shown by a continuous line and flux by a dotted line. The first graph shows the voltage and flux in the first phase windings. Prior to the first time, $T_1$, the switching in the inverter is working conventionally to create an AC current in each of the phase windings. Initially the first phase windings are connected to the positive DC terminal and so voltage across the first phase windings is equal to $V_{DC}$. At the first time, $T_1$ the transition to ASC mode begins. The flux across the first phase is greatest and so the first phase is connected to the negative DC link at the first time, $T_1$, and so the voltage across the first phase goes to zero. The relative flux across the first phase is measured with respect to the first phase, so is zero.

At the same time, the second and third phase windings are connected to the positive DC link. The voltage and flux across the windings of the second and third phases are shown in the second and third graphs of FIG. 3. Here, the second phase windings had previously been connected to the negative DC link, so at the first time, $T_1$, the voltage across the second phase windings goes from zero to $V_{DC}$. Initially the third phase windings had been connected to the positive DC link already, so the third phase windings simply stayed connected to the positive DC link (with a voltage of $V_{DC}$).

The initial relative flux in the second phase windings is −2 Vs. As the second phase is connected to the positive DC link the flux across the positive DC link increases until at the second time, $T_2$, the flux across the second phase windings is the same as the flux across the first phase windings (i.e. the relative flux is zero). At the second time, $T_2$, the second phase is connected to the negative DC link terminal and so goes to zero. After that, the flux in the second phase windings does not change.

Similarly, the flux across the third phase windings also increases from the first time, T1. The flux in the third phase windings does not match that of the first phase windings until the third time, T3, at which point the third phase is also connected to the negative DC link terminal. At this point, the motor is in full ASC mode.

Although in the embodiment described above the first phase to be selected at step 204 is the phase on which the flux is highest, in other embodiments an additional selection criterion for the first phase can be used.

The selection in step 204 of which phase to short circuit first can depend on whether the short circuit mode is to be implemented by connecting the output terminals 60, 62, 64 to the positive or negative terminal of the DC link circuit 30, i.e. whether the switches 40, 42, 44 on the upper branches or the switches 50, 52, 54 on the lower branches are to be maintained in a closed position. In alternative embodiments the motor output terminals may be connected to the positive DC link terminal to implement the ASC mode and in this case the phase with the lowest, or most negative, magnetic flux could be selected as the first phase in step 204. Generally at step 208 the other phases are then connected to the opposite DC link terminal from the DC link terminal to which the first phase was connected in step 206, so in such alternative embodiments in step 208 the other two phases would be connected to the negative DC link terminal.

In some embodiments the step 204 of selecting a first phase to short circuit first comprises selecting whether to connect the output terminals 60, 62, 64 to the positive or negative terminal of the DC link circuit 30. The selection of whether to connect the output terminals 60, 62, 64 to the positive or negative terminal of the DC link circuit 30 may be based on the phase voltages at the transition time, e.g. to select the DC link terminal which allows the lowest voltage difference between the first phase and selected DC link terminal.

In some embodiments the phase having maximum flux will be selected as the first phase, e.g. the phase having maximum flux across the phase windings in the motor at the start time for transitioning into the short circuit mode.

In alternative embodiments, step 202 further comprises determining the first time at which to short circuit the first phase prior to performing the short circuiting of the first phase. Upon determining ASC mode should be implemented, timing for implementing the ASC mode may also be selected, e.g. a start time for transitioning into the ASC mode, such as a first time on which to short circuit a first phase of the motor. Generally this time will be practically immediately after determining that a condition is present for which ASC mode should be selected, however occasionally there may be some delay.

In the embodiments described above, absolute flux is calculated for each phase at step 200, and then the relative flux between the phases is determined at step 210. However, in alternatives it is possible to calculate relative flux in the monitoring phase at step 200.

For example, where flux is determined in relation to the first phase, the relative flux of the second phase would be given by:

$$\text{Flux}_{2wrt1}(t) = D\text{Flux}_{2wrt1}(t-\Delta t) + (\overline{V}_2 - \overline{V}_1) \cdot \Delta t$$

Where $\text{Flux}_{2wrt1}(t)$ is the flux across the second phase relative to the flux across the first phase in the motor at time t:

$\Delta t$ is the sample time, i.e. the time intervals between subsequent voltage measurements (measured in seconds); $\Delta t$ will generally be between around 30 μs to 500 μs.

$\overline{V}_1$ is the average voltage at the first phase output terminal 60 between time t and time t-$\Delta t$; for example $\overline{V}_1$ may be calculated by adding together the voltage at the first phase output terminal at time t and at time t–Δt and dividing by two, e.g.

$$\bar{V}_1 = \frac{V_1(t) + V_1(t - \Delta t)}{2}$$

$\bar{V}_2$ is the average voltage at the second phase output terminal 62 between time t and time t–Δt, e.g.

$$\bar{V}_2 = \frac{V_2(t) + V_2(t - \Delta t)}{2};$$

D is a damping factor, generally having a value between 0 and 1, preferably between around 0.9 and 0.99.

Analogously, for the third phase the flux relative to the first phase can be found by:

Flux$_{3wrt1}$(t)=DFlux$_{3wrt1}$(t–Δt)+($\bar{V}_3$–$\bar{V}_1$)·Δt

Where Flux$_{3wrt1}$(t) is the relative flux across the third phase in the motor at time t; and
$\bar{V}_3$ is the average voltage at the second phase output terminal 62 between time t and time t–Δ, e.g.

$$\bar{V}_3 = \frac{V_3(t) + V_3(t - \Delta t)}{2}.$$

Whilst in steps 200, 204 and 210 one specific way of determining the flux has been used, alternatives are available. For example, to calculate the phase flux in one of the motor windings 70, 72, 74 corresponding to the second phase, the current in the motor winding 72 may be measured (e.g. by current sensor 80) and a model relating current to flux can be used. In another example, current in the motor winding 72 may be measured (e.g. by current sensor 80) and the angle of the rotor 24 recorded. Then a look up table can be used to relate the motor current and rotor angle to the magnetic flux in the phase. The model or lookup table may be stored in the memory of the inverter controller, or an additional controller arranged to manage the transition to ASC mode. For example, the model or lookup table may be specific to the type of motor and included in setup files for the inverter that are installed on the relevant controller.

In the embodiment described above, the subsequent second and third times for each of the second and third phases to be short circuited are determined in step 212 based on the relative flux in each of the second and third phase windings at the first time, i.e. at the time the first phase is short circuited. However, it can be advantageous to continue to monitor the flux in the second and third phases in case the flux does not change in a predictable manner, e.g. linearly, and to adjust the second and third time accordingly. For example, the voltage of the DC link may fluctuate and so the flux in each phase may change at a variable rate.

Therefore in alternative embodiments step 210 involves determining the flux in the second and third phases at a plurality of sampling times after the first time. Consecutive sampling times can be separated by a predetermined sampling time period, or in other words the sampling times are at a predetermined sampling frequency. Step 212 then involves calculating an estimated subsequent time for each of the other phases to short be circuited and updating this estimated subsequent time each time the magnetic flux is determined. Thus steps 210 and 212 can be performed in parallel. The estimated subsequent time is the time at which the flux in the other phase is predicted to match the flux in the first phase. When the estimated subsequent time falls within the next sampling period (i.e. is earlier than the sampling time immediately following the current sampling time), that estimated subsequent time is selected as the time at which to short circuit the windings in that phase.

In some embodiments, the flux in each phase at each sampling time is determined by estimating the change in flux in that phase over the sampling period preceding the sampling time. The change in flux may be estimated by averaging the voltage of the DC link at the previous sampling time and the voltage of the DC link at the current sampling time. The flux at the sampling time may thus be found and using the equation:

$$Flux_x(t) = D\ Flux_x(t - \tilde{t}) + \left(\frac{V_{DC}(t) + V_{DC}(t - \tilde{t})}{2}\right)\tilde{t}$$

Here t is the current time, $\tilde{t}$ is the sampling period, so (t–$\tilde{t}$) is the previous sampling time, D is the damping factor and $V_{DC}$ is the DC link voltage. Flux$_x$ is the flux in the $x^{th}$ phase winding.

Calculating an estimated subsequent time can be done by estimating the remaining time for the flux to reach the flux of the first phase windings and adding this to the current time. In order to do this estimate, it may for example be assumed that the voltage of the DC link will remain the same as it is at the current sampling time. The subsequent time can thus be calculated as follows:

$$T_x = t + \frac{Max(Flux_1, Flux_2, Flux_3) - Flux_x(t)}{V_{DC}(t)}$$

$T_x$ is the time at which to short circuit the $x^{th}$ phase windings. The maximum flux (here the flux of the first phase) will not have changed, since it will have been short-circuited already at the first time. Thus where relative fluxes are used, the term Max(Flux$_1$, Flux$_2$, Flux$_3$) will simply be zero.

In some embodiments the sampling time period, $\tilde{t}$ is around 100 microseconds, for example the sampling time period can be between around 1 microsecond and 10 milliseconds, preferably between 10 microseconds and 1 millisecond, or more preferably between 50 microseconds and 200 microseconds. The sampling time period may be, for example, around 30 μs to 500 μs, or around 100 μs to 300 μs In preferred embodiments the sampling frequency is the same as the pulse width modulation (PWM) timebase (or minimum PWM switching frequency) for the inverter.

Often the selected time at which to short circuit the windings in one of the phases (connect to the positive or negative DC terminal) does not coincide exactly with the PWM timebase of the inverter. In such cases it is possible to adjust the switch time by providing a shorter pulse than normal, i.e. a pulse that is shorter than the normal minimum PWM switch rate, to short circuit the phase windings at the selected time.

For example, where the PWM timebase is 100 microseconds and it is estimated the flux in the second phase will match the flux in the first phase in 73 microseconds, it is possible to provide a shorter pulse 73 microseconds in length and so connect the second phase windings to the negative DC link terminal after 73 microseconds.

Figure 4:
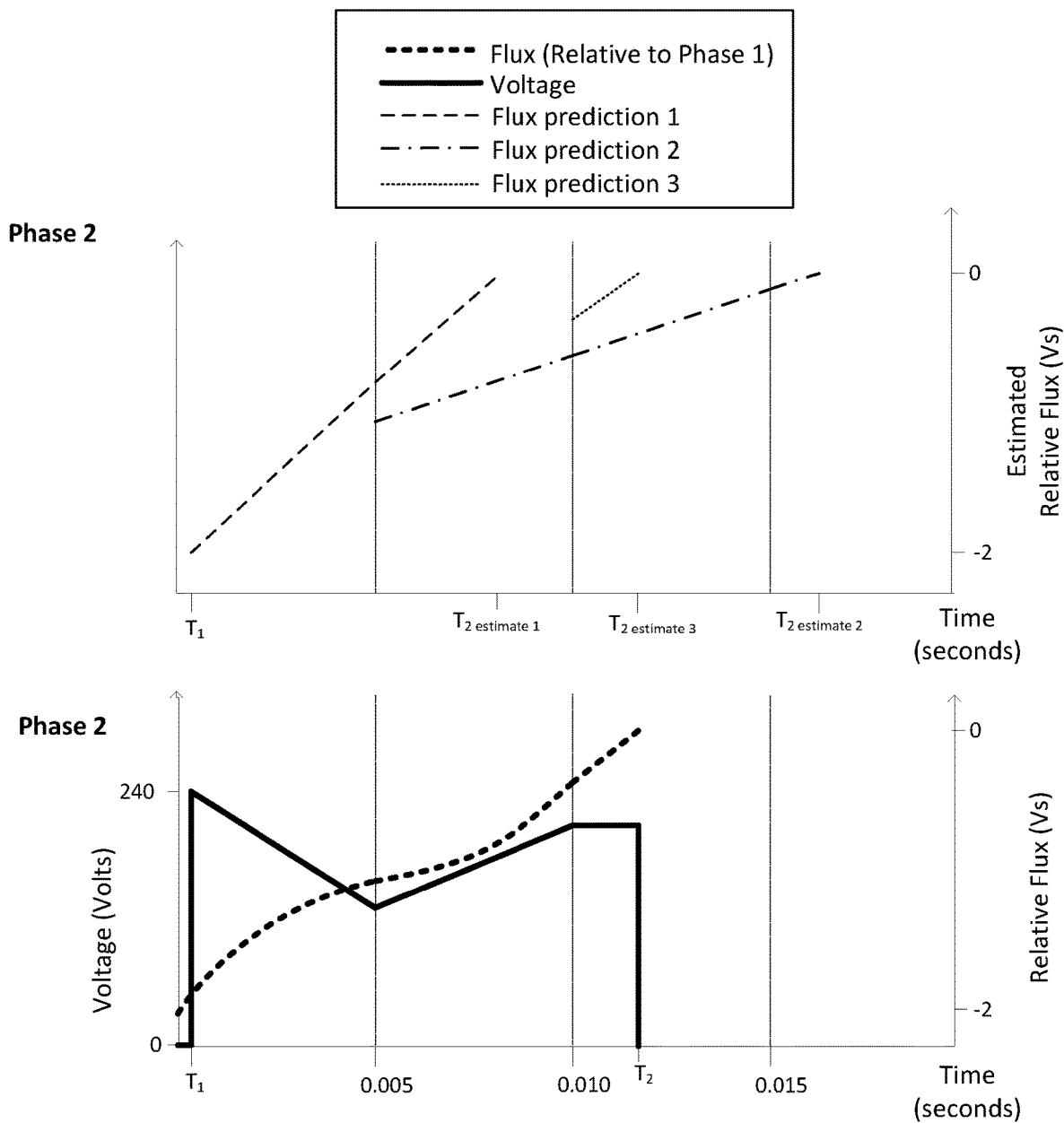
FIG. 4 shows graphs of the voltage and flux and the predicted flux for one motor phase winding.

FIG. 4 shows two graphs of the voltage and flux in the second phase windings when the flux estimate and second time are recalculated periodically, at sampling time periods. Here the sampling period is 0.005 seconds. The timebase for the PWM is also 0.005 seconds. The lower graph shows the voltage across the second phase and the actual flux in the second phase windings. The upper graph shows the estimated flux predictions at successive sampling times and the corresponding estimated second times are marked along the bottom axis. Both graphs have the same time scale.

As in the example of FIG. 3, the relative flux in the second phase windings at the first time is −2 Vs and the initial voltage of the DC link is 240V. Therefore the first estimate of the second time (made at the first time, $T_1$) is 0.0083 seconds.

However, as can be seen from the lower graph, the voltage across the DC link decreases during the first sampling period. Therefore at the second sampling time (t=0.005 s) the measured voltage is lower. Thus the flux change is less than was initially expected. A second flux prediction is made at the second sampling time, based on the current flux and assuming the voltage of the DC link will remain constant. From this a second estimate of the second time is made. The second estimate of the second time is now greater than 0.015 seconds, at this new, lower, voltage.

Between the second sampling time (t=0.005 s) and the third sampling time (t=0.010 s) the voltage increases again, as shown on the lower graph. Therefore the flux change between the second and third sampling times is greater than previously predicted. At the third sampling time a third flux prediction is made at the second sampling time, based on the current flux and assuming the voltage of the DC link will remain constant. From this a third estimate of the second time is made. The third estimate of the second time is now 0.012 s. This means the estimate of the time to switch the second phase to the negative terminal of the DC link is in the next sampling period (before the fourth sampling time, which would be at t=0.015 s). Therefore the third estimate is now selected as the second time. Then a short pulse of 0.002 s is applied (rather than the normal 0.005 s pulse) and the second phase windings are connected to the DC link at the selected second time (0.012 s). As can be seen from the bottom graph, the relative flux in the second phase windings is zero at the second time, $T_2$.

Please note the numbers in this example have been simplified slightly for ease of explanation.

A similar process may be used to determine the third time for short circuiting the third phase to the DC link.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A method of controlling an inverter supplying power to a permanent magnet AC, PMAC, motor having a plurality of phase windings, the method comprising:
   selecting a first phase winding of the PMAC motor;
   electrically connecting the first phase winding to a first DC terminal of a DC link circuit at a first time, and maintaining the connection between the first phase winding and the first DC terminal;
   determining a flux difference between the first phase winding and a second phase winding of the PMAC motor;
   selecting a second time, different to the first time, to electrically connect the second phase winding to the first DC terminal, wherein the second time is selected based on the determined flux difference between the first phase winding and the second phase winding;
   electrically connecting the second phase winding to the first DC terminal at the second time, and maintaining the connection between the second phase winding and the first DC terminal.

2. A method according to claim 1, further comprising:
   electrically connecting the second phase winding to a second terminal of the DC link circuit for a time interval between the first time and the second time.

3. A method according to claim 2, wherein the time interval between the first time and the second time is selected based on the determined flux difference between the first phase winding and the second phase winding and a DC voltage of the second terminal of the DC link.

4. A method according to claim 1, wherein the second time and/or the time interval is selected based on the time required for the flux difference between the first phase winding and the second phase winding of the PMAC motor to reach zero.

5. A method according to claim 4, wherein selecting the second time and/or the time interval comprises:
   collecting motor data at a plurality of sampling times, wherein there is a predetermined sampling time period between consecutive sampling times;
   calculating a corresponding plurality of time estimates; the time estimates each being an estimate of the time required for the flux difference between the first phase winding and the second phase winding of the PMAC motor to reach zero based on the collected motor data for the sampling time;
   comparing each of the plurality of time estimates to the predetermined sampling time period; and
   selecting a first time estimate that is shorter than or equal to the predetermined sampling time period;
   using the selected first time estimate to select the second time.

6. A method according to claim 5, wherein the step of connecting the second phase winding to the first DC terminal at the second time comprises:
   applying a pulse of the length of the selected time estimate to electrically connect the second phase winding to the first DC terminal at the second time.

7. A method according to claim 5, wherein the inverter has a pulse width modulation timebase equal to the sampling time period.

8. A method according claim 1, further comprising:
   determining a flux difference between the first phase winding and a third phase winding of the PMAC motor;
   selecting a third time, different to the first time and the second time, to electrically connect the third phase winding to the first DC terminal, wherein the third time is selected based on the determined flux difference between the first phase winding and the third phase winding of the PMAC motor;
   electrically connecting the third phase winding to the first DC terminal at the third time, and maintaining the connection between the third phase winding and the first DC terminal.

9. A method according to claim 1, wherein selecting a first phase winding of the PMAC motor comprises:
determining the flux in each of the plurality of phase windings of the PMAC motor; and
selecting as the first phase winding, the phase winding having the highest flux value.

10. A method according to claim 1, further comprising, prior to the first time:
switching a plurality of switching elements in the inverter to provide an AC power supply to each phase winding.

11. A method according to claim 10, further comprising:
monitoring the flux in each of the plurality of phase windings of the PMAC motor whilst switching the switching elements to provide the AC power supply to each phase winding.

12. A method according to claim 11, wherein determining a flux difference between the first phase winding and a second phase winding and/or a third phase winding of the PMAC motor is based on the monitored flux in the first phase winding and second and/or third phase windings at the first time.

13. A method according to claim 1, wherein the second time, and optionally the third time, are later than the first time.

14. A method according to claim 1, wherein determining the flux difference between the first phase winding and the second phase winding of the PMAC motor comprises:
determining the voltage across the first phase winding as a function of time;
determining the voltage across the second phase winding as a function of time;
integrating the voltage across the first phase winding with respect to time;
integrating the voltage across the second phase winding with respect to time; and
determining the difference between the integral of the voltage across the first phase and the integral of the voltage across the second phase.

15. A method according to claim 1, wherein determining the magnetic flux difference between the first phase winding and the second phase winding of the PMAC motor comprises:
determining the voltage across the first phase winding as a function of time;
determining the voltage across the second phase winding as a function of time;
determining the difference between the voltage across the first phase winding and the voltage across the second phase winding as a function of time; and
integrating the difference between the voltage across the first phase winding and the voltage across the second phase winding with respect to time.

16. A computer-readable medium comprising instructions which, when executed by a computer, cause the computer to carry out the method of claim 1.

17. A method of controlling an inverter supplying power to a permanent magnet AC, PMAC, motor, the method comprising:
initiating an active short circuit mode of the inverter, wherein the inverter comprises a plurality of power output terminals, and each power output terminal is switchably connected to two DC terminals of a DC link circuit by switching elements for providing an AC power supply at the each power output terminal, and
wherein the each power output terminal is configured to provide said AC power supply to a corresponding one of a plurality of phase windings of the PMAC motor, and
wherein in the active short circuit mode selected ones of the switching elements are maintained in a conducting state so that the plurality of power output terminals are electrically connected together;
wherein initiating the active short circuit mode comprises:
selecting a first power output terminal of the plurality of power output terminals, wherein the first power output terminal corresponds to a first phase winding of the PMAC motor;
switching a first switching element into the conducting state at a first time to electrically connect the first phase winding to a first DC terminal of the two DC terminals, and maintaining the first switching element in the conducting state, and
determining a flux difference between the first phase winding and a second phase winding of the PMAC motor, wherein a second power output terminal of the plurality of power output terminals corresponds to the second phase winding of the PMAC motor;
selecting a second time, different to the first time, to electrically connect the second power output terminal to the first DC terminal, wherein the second time is selected based on the determined flux difference between the first phase winding and the second phase winding of the PMAC motor;
switching a second switching element into the conducting state at the second time to electrically connect the second phase winding to the first DC terminal, and maintaining the second switching element in the conducting state.

18. A controller for controlling an inverter supplying power to a permanent magnet AC, PMAC, motor having a plurality of phase windings, the controller comprising a processor configured to:
select a first phase winding of the PMAC motor;
electrically connect the first phase winding to a first DC terminal of a DC link circuit at a first time, and maintain the connection between the first phase winding and the first DC terminal;
determine a flux difference between the first phase winding and a second phase winding of the PMAC motor;
select a second time, different to the first time, to electrically connect the second phase winding to the first DC terminal, wherein the second time is selected based on the determined flux difference between the first phase winding and the second phase winding;
electrically connect the second phase winding to the first DC terminal at the second time, and maintain the connection between the second phase winding and the first DC terminal.

19. A system comprising:
a controller according to claim 18; and
an inverter for a multi-phase permanent magnet motor having a first phase switching circuit and a second phase switching circuit.

20. A controller for controlling an inverter supplying power to a permanent magnet AC, PMAC, motor, the controller comprising a processor configured to:
initiate an active short circuit mode of the inverter, wherein the inverter comprises a plurality of power output terminals, and each power output terminal is switchably connected to two DC terminals of a DC link circuit by switching elements for providing an AC power supply at the each power output terminal, and wherein the each power output terminal is configured to provide said AC power supply to a corresponding one of a plurality of phase windings of the PMAC motor, and wherein in the active short circuit mode selected ones of the switching elements are maintained in a conducting state so that the plurality of power output terminals are electrically connected together;

wherein initiating the active short circuit mode comprises the processor:

selecting a first power output terminal of the plurality of power output terminals, wherein the first power output terminal corresponds to a first phase winding of the PMAC motor;

controlling a first switching element to switch into the conducting state at a first time to electrically connect the first phase winding to a first DC terminal of the two DC terminals, and controlling the first switching element to remain in the conducting state, and determining a flux difference between the first phase winding and a second phase winding of the PMAC motor, wherein a second power output terminal of the plurality of power output terminals corresponds to the second phase winding of the PMAC motor;

selecting a second time, different to the first time, to electrically connect the second power output terminal to the first DC terminal, wherein the second time is selected based on the determined flux difference between the first phase winding and the second phase winding of the PMAC motor;

controlling a second switching element to switch into the conducting state at the second time to electrically connect the second phase winding to the first DC terminal, and controlling the second switching element to remain in the conducting state.

* * * * *